(12) United States Patent
Heaston et al.

(10) Patent No.: US 7,472,866 B2
(45) Date of Patent: Jan. 6, 2009

(54) DEPLOYMENT SYSTEM AND METHOD FOR SUBSURFACE LAUNCHED UNMANNED AERIAL VEHICLE

(75) Inventors: Jeremy R. Heaston, Weston, CT (US); David E. Toth, Westport, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 211 days.

(21) Appl. No.: 11/602,436

(22) Filed: Nov. 15, 2006

(65) Prior Publication Data

US 2008/0111021 A1    May 15, 2008

(51) Int. Cl.
 *B64F 1/04* (2006.01)
 *F41F 3/00* (2006.01)
 *F41F 3/04* (2006.01)

(52) U.S. Cl. .................................. 244/63; 89/1.81
(58) Field of Classification Search ................ 244/1 R, 244/63, 114 R, 100 A, 171.6; 114/261; 441/2, 441/7, 10, 32, 33; 89/1.809, 1.81, 1.818, 89/1.802

See application file for complete search history.

(56) References Cited

U.S. PATENT DOCUMENTS

| | | | | |
|---|---|---|---|---|
| 2,470,783 A | * | 5/1949 | Mead | 441/8 |
| 2,735,391 A | * | 2/1956 | Buschers | 89/1.802 |
| 3,208,346 A | | 9/1965 | Penza et al. | |
| 3,245,318 A | | 4/1966 | Finkelstein et al. | |
| 3,249,014 A | | 5/1966 | Daughenbaugh | |
| 3,279,319 A | * | 10/1966 | Semonian et al. | 89/1.81 |
| 3,340,767 A | | 9/1967 | Penza | |
| 3,513,750 A | | 5/1970 | Penza | |
| 3,526,166 A | * | 9/1970 | Pfister | 89/1.802 |
| 3,755,836 A | * | 9/1973 | Milazzo | 441/22 |
| 3,848,558 A | * | 11/1974 | Henry | 114/313 |
| 4,147,124 A | * | 4/1979 | Brooks et al. | 114/321 |
| 4,410,151 A | * | 10/1983 | Hoppner et al. | 244/63 |
| 4,471,923 A | * | 9/1984 | Hoppner et al. | 244/63 |
| 4,553,718 A | * | 11/1985 | Pinson | 244/3.15 |
| 5,118,052 A | * | 6/1992 | Alvarez Calderon | 244/49 |
| 5,170,005 A | | 12/1992 | Mabry et al. | |
| 5,363,791 A | * | 11/1994 | Stallard, III | 114/318 |
| 5,615,847 A | | 4/1997 | Bourlett | |
| 5,677,506 A | * | 10/1997 | Wallin | 89/38 |

(Continued)

*Primary Examiner*—Michael R Mansen
*Assistant Examiner*—Stephen Brookman
(74) *Attorney, Agent, or Firm*—James M. Kasischke; Michael P. Stanley; Jean-Paul A. Nasser

(57) ABSTRACT

A launch system in which an unmanned aerial vehicle is secured to a platform in a watertight tube adapted to be launched from a submerged platform. Once launched, side panels on the tube are jettisoned and a flotation device is deployed to bring the tube to the surface. The flotation device maintains the tube in a vertical position when rising to and at the surface. After surfacing, a top-sealing cap of the tube is opened. A lifting mechanism within the tube raises the vertically oriented platform assembly up within the tube. Guide rails maintain the vertical orientation of the assembly during lifting. At the topmost point of travel, the assembly is raised clear of the tube and is disengaged from the guide rails, allowing the assembly to pivot about its attachment to the lifting mechanism and assume an orientation favorable for launching the UAV.

18 Claims, 6 Drawing Sheets

U.S. PATENT DOCUMENTS

| | | | |
|---|---|---|---|
| 6,056,237 A * | 5/2000 | Woodland | 244/3.15 |
| 6,164,179 A | 12/2000 | Buffman | |
| 6,286,410 B1 * | 9/2001 | Leibolt | 89/1.809 |
| 6,354,182 B1 | 3/2002 | Milanovich | |
| 6,487,952 B1 | 12/2002 | Borgwarth et al. | |
| 7,097,136 B2 * | 8/2006 | Ruszkowski, Jr. | 244/105 |
| 2003/0089820 A1 * | 5/2003 | Martorana et al. | 244/3.1 |

* cited by examiner

DEPLOYMENT SYSTEM AND METHOD FOR SUBSURFACE LAUNCHED UNMANNED AERIAL VEHICLE

STATEMENT OF GOVERNMENT INTEREST

The invention described herein may be manufactured and used by or for the Government of the United States of America for Governmental purposes without the payment of any royalty thereon or therefore.

BACKGROUND OF THE INVENTION (1) Field of the Invention

The present invention relates to subsurface launched unmanned aerial vehicles (UAVs) and is directed more particularly to a deployment system for launching a vertical take off and landing (VTOL) UAV or a fixed-wing UAV.

(2) Description of the Prior Art

The launching of UAVs from submarines, or other subsurface platforms, is known in the art, e.g., the launching of cruise missiles and other types of missiles and high-speed vehicles. For some purposes, slower speed UAVs are preferred and launch systems for such UAVs are being developed. Some slower speed UAV systems have disadvantages and/or limitations.

One system relies on buoyancy to provide the UAVs initial upward momentum to separate the UAV from a launcher. Thus, once released from the underwater platform, one commonly used launcher does not allow for a time-delayed launch of the UAV, which can compromise or reveal the position of the underwater platform. Additionally, the launcher relies on a booster or the like to initially power the UVA once it is separated. This launching mechanism creates a flame or smoke plume, referred to as a "flame datum", which also compromises the platform location. Two typically used launchers cannot be launched at submarine test depth or in shallow water due to risks of the capsules striking the hull of the submarine or other underwater platform.

Accordingly, there is a need for a deployment system for launching a UAV from a subsurface platform, which allows for a time delayed launch without a significant flame or smoke plume, that can launch a UAV at test depth or in shallow water and that can accommodate a variety of UAVs, such as VTOL UAVs and fixed-wing UAVs.

SUMMARY OF THE INVENTION

It is therefore a general object and a primary purpose of the present invention to provide a deployment system adapted to be launched from a submerged platform at varying depths, to convey a UAV to the surface and to deploy a surface platform for launching the UAV.

It is a further object of the present invention to provide a deployment system adapted to accommodate delayed deployment of the surface platform and launching of the UAV without a flame datum.

In order to attain these objects, there is provided a watertight tube or capsule that can be launched from a submerged platform and that encapsulates a UAV and a UAV launch platform. The UAV is secured to the platform and the UAV-platform assembly is oriented along a longitudinal axis of the tube. Once launched from and clear of the submerged platform, side panels on the tube are jettisoned and a flotation device, such as a flotation collar, is deployed to bring the tube to the surface. The flotation device is configured such that the tube is maintained in a vertical position when rising to the surface and when the tube and flotation device are at the surface.

Upon surfacing, or after a predetermined delay, and preferably at a time when sensors on and/or within the tube determine that surface conditions are satisfactory, the top-sealing cap of the tube is opened. A lifting mechanism within the tube, such as a winch or other powered lift, raises the vertically oriented UAV-platform assembly within the tube. Guide rails within the tube maintain the vertical orientation of the assembly during lifting. At the topmost point of travel, the assembly is raised clear of the tube and is disengaged from the guide rails, allowing the assembly to pivot about its attachment to the lifting mechanism and assume an orientation favorable for launching the UAV. For a VTOL UAV, the platform and UAV assembly can be configured to assume a generally horizontal orientation. For a fixed wing UAV, the orientation may be inclined, e.g., at angles of between 32 and 45 degrees, so as to provide a ramp for launching the UAV.

In one embodiment, a system for deploying an Unmanned Aerial Vehicle (UAV) from a platform submerged in a medium includes a capsule enclosing the UAV in a watertight manner when submerged, a floatation device attached to the capsule, the floatation device providing buoyancy to the capsule to bring the capsule to a surface of the medium after launch of the capsule from the submerged platform, a hatch forming an opening in the capsule after the capsule reaches the surface to allow the UAV to exit the capsule, a lifting means within the capsule for moving the UAV from within the capsule, through the hatch and to a position exterior to the capsule and a cradle for releasably supporting the UAV, the cradle and UAV rotating between an interior orientation and a launch orientation when the UAV reaches the position exterior to the capsule.

In one aspect, the system includes guide means to maintain the interior orientation of the cradle and UAV during movement of the UAV within the capsule. The guide means can include one or more rails fixed within the capsule and one or more extensions of the cradle that slidably mate with the guide rail. The guide means can include bearings, such as linear bearings, to facilitate the sliding movement between the extension and the rail.

In another aspect, the floatation device forms a collar at least partially surrounding the capsule when the floatation device is inflated. The collar is offset from a center of gravity of the capsule to maintain a longitudinal axis of the capsule in a substantially vertical position when the capsule reaches the surface. The floatation device can include a plurality of chambers. Removable panels that conform to the shape of the capsule can cover the floatation device during launch from the submerged platform and prior to inflation of the floatation device.

In a further aspect, the lifting means can include a motorized winch and a cable attached at one end to the winch and at the other end to the cradle; such that when the cable is wound on the winch the cradle and UAV move within the capsule. In other aspects, the lifting means can be selected from one of a winch and cable system, a hydraulic piston, rack and pinion gearing, a screw drive and/or a chain drive.

In another aspect, the system can include a power source within the capsule for providing power for operation of the system, controls for controlling operation of system and sensors for obtaining measurements of ambient conditions at least one of within and exterior to the capsule. The sensors can measure a depth of the medium for determining when the floatation device is to be activated. The sensors also can measure sea state conditions exterior to the capsule when the capsule reaches the surface for determining when the hatch is to be opened.

In still other aspects, the UAV is a vertical take-off and landing UAV and the launch orientation is substantially horizontal. In yet another aspect, the UAV is a fixed-wing UAV, the cradle includes a ramp structure on the cradle with the fixed-wing UAV being releasably attached to the ramp structure such that the launch orientation of the fixed-wing UAV slopes upward away from the surface and a launching mechanism assists the fixed-wing UAV in moving up the ramp structure during launch. The lifting surfaces of the UAV can be stored in a folded position within the capsule.

In one embodiment, a system for deploying an Unmanned Aerial Vehicle (UAV) from a submerged platform includes a watertight elongated cylindrical capsule enclosing the UAV, a floatation device providing buoyancy to the capsule to bring the capsule to a surface after launch of the capsule from the submerged platform, the floatation device maintaining a longitudinal axis of the capsule substantially vertical, a lifting means within the capsule for moving the UAV vertically within the capsule, a removable cap forming an opening in the capsule, the lifting means moving the UAV through opening and a cradle for releasably supporting the UAV, the cradle and UAV rotating between a vertical interior orientation and a substantially horizontal launch orientation upon the UAV passing through the opening.

In one aspect, the system includes one or more guide rails fixed within the capsule, one or more extensions of the cradle that slidably mate with the guide rails and bearings to facilitate sliding movement between the extensions and the rails. In another aspect, the lifting means can include a motorized winch, a cable attached at one end to the winch and at the other end to the cradle, wherein the cable is wound on the winch to move the cradle and UAV within the capsule.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

Figure 1:
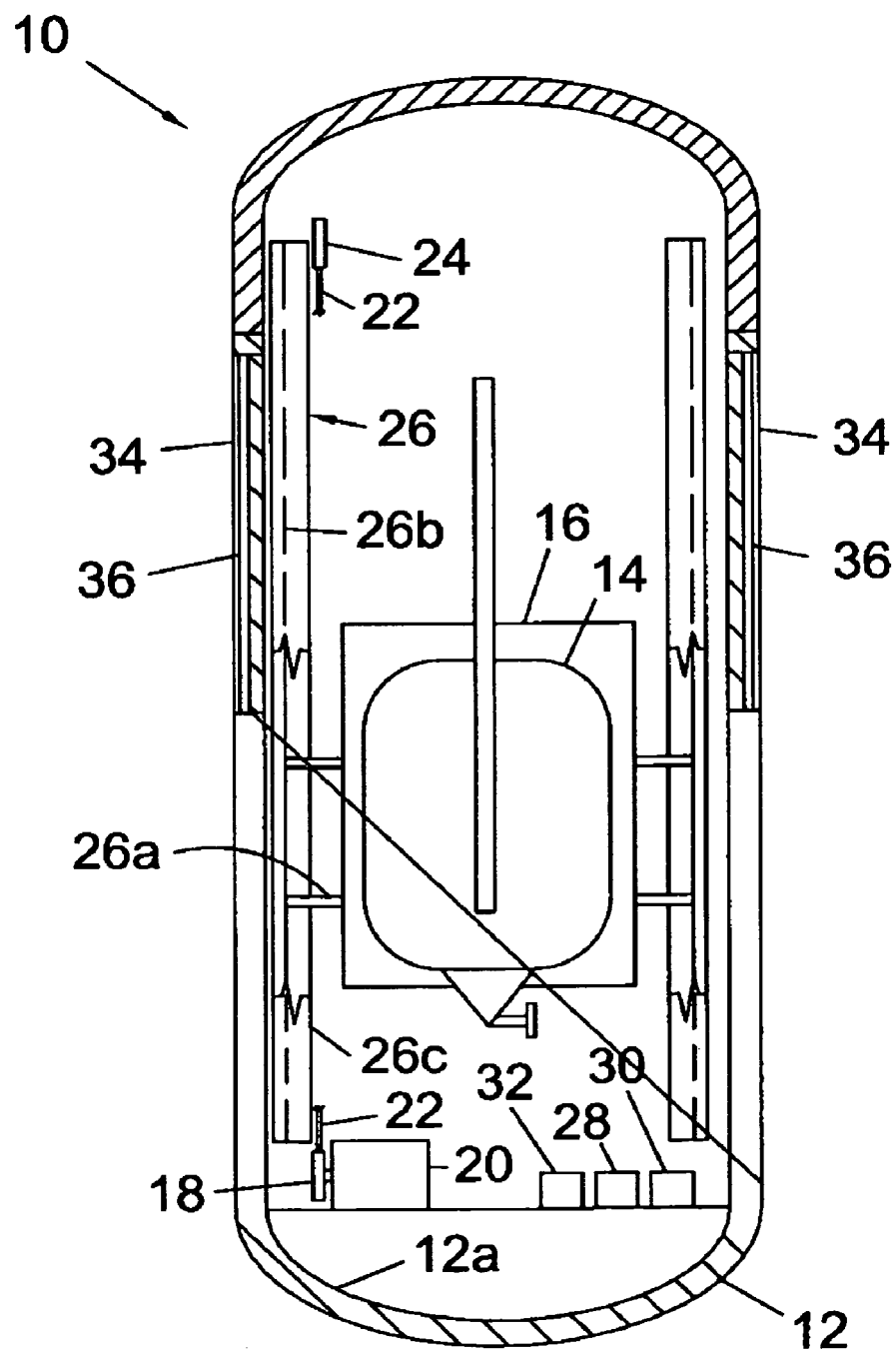
FIG. 1 illustrates a schematic sectional view of a UAV deployment system of the present invention.

Referring to FIG. 1, there is shown a schematic sectional view of a UAV deployment system 10 of the present invention. The deployment system 10 includes an encapsulating tube or capsule 12, which is configured for launch from an underwater platform, such as a submarine or other mobile or stationary platform. Preferably, the capsule 12 can be a modified version of an existing capsule that may be launched from an underwater platform, e.g., a modified Harpoon Missile Capsule. However, it is understood that the capsule 12 can be configured with any shape and size to suit the intended purposes described herein.

In operation, the capsule 12 forms a watertight seal for a UAV 14 and other components contained therein. The UAV 14 can be releasably mounted on a support platform or cradle 16. For the orientation of the capsule 12 illustrated in FIG. 1, the cradle 16 and the UAV 14 mounted thereon are movable in a vertical direction within capsule. For ease of illustration, but not for limitation, the means for moving the cradle 16 and UAV 14 is illustrated in the exemplary embodiments shown in the figures and described herein as having a winch drum 18 that is turned by a motor 20. Cable 22 is attached at one end to the drum 18 and attached at the other end to the cradle 16 via pulleys 24. As the drum 18 is turned by the motor 20, the cable 22 is wound onto the drum 18 and in turn pulls the cradle 16 and the UAV 14 mounted thereto in a vertical direction. Lifting or moving means other than that shown in the figures may be utilized; including but are not limited to hydraulic pistons, screw and/or chain drives, rack and pinion gearing, and/or combinations thereof. For ease of explanation and generalization, further reference herein to the drum 18 or lifting means will be understood to refer to any of the above lifting means.

Guide means 26 can maintain the proper orientation of the cradle 16 and the UAV 14 during movement. For the exemplary embodiment of FIG. 1, guide means 26 can include one or more tabs 26a on the cradle 16 that mate with a slot 26b in rail 26c that is mounted to interior surface 12a of the capsule 12. For ease of travel, bearings, rollers or the like may be incorporated into rails 26c or tabs 26a. Other configurations of guide means as are known in the art may be contemplated. For example, but without limitation, the cradle 16 may be configured with rollers, which contact the interior surface 12a of the capsule 12, or the interior surface may include rollers or linear bearings to guide the cradle 16. It will be understood that other combinations and/or configurations of rails, tabs, rollers, bearings and the like may be used.

Additionally, the capsule 12 can include electronic controls 28, sensors 30 and a power source 32 for operation of the components of the deployment system 10. The configuration shown in FIG. 1 for the controls 28, the sensors 30 and the power source 32 is for illustrative purposes and it is understood that the controls, the sensors and power source may be configured at various locations within capsule 12 as suitable for the overall configuration of the deployment system 10. Furthermore, the exterior of the capsule 12 includes two or more retaining panels 34, which cover floatation device 36, shown un-inflated in FIG. 1. The panels 34 may serve to protect the floatation device 36 during a launch of the capsule 12.

Figure 2:
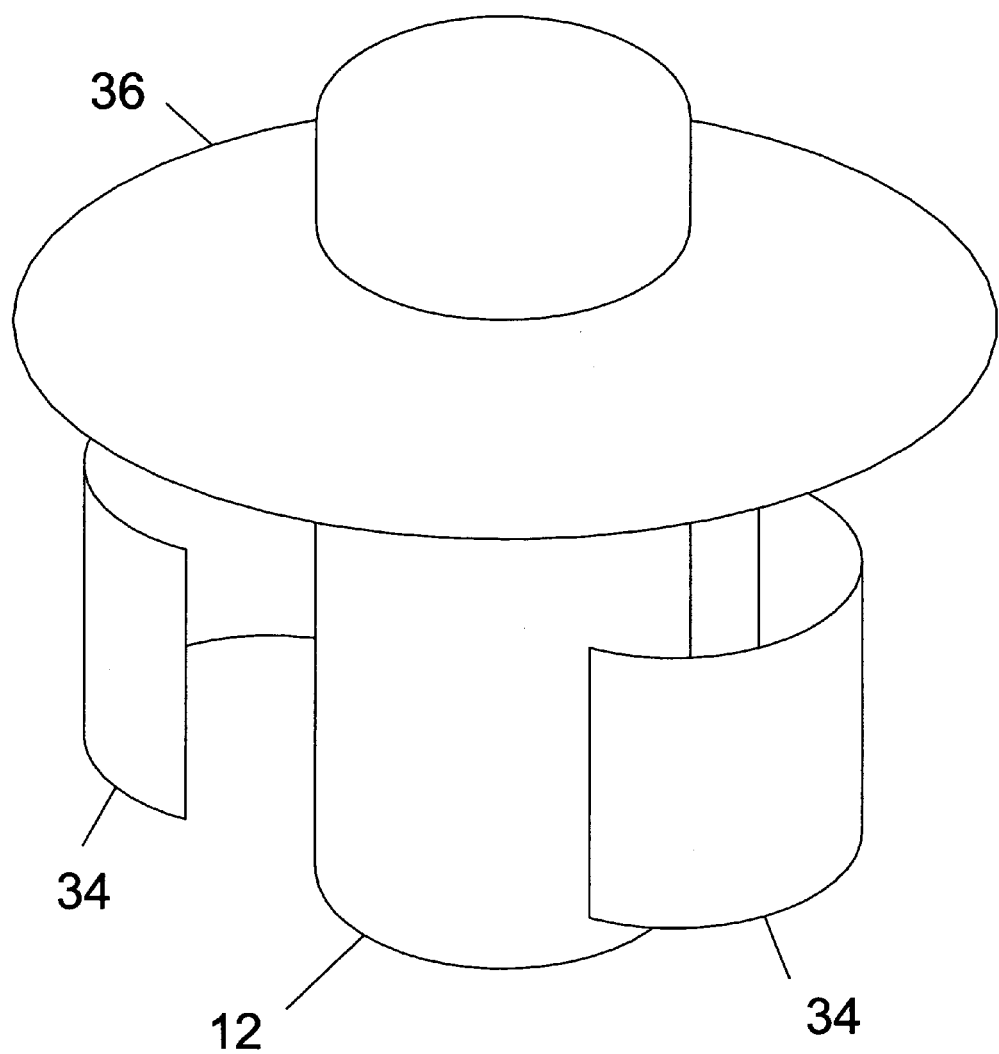
FIG. 2 illustrates a flotation device of the UAV deployment system of the present invention.

Referring now to FIG. 2, an isometric view of the capsule 12 is illustrated after the panels 34 have been separated therefrom and the floatation device 36 is deployed. Deployment of the floatation device 36 may be at a predetermined depth, as may be determined by the sensors 30. The panels 34 may be securely but releasably attached to the capsule 12 by explosive bolts that discharge at the predetermined depth. Other means known in the art may be used, including without limitation, spring-loaded latches, magnetic catches, solenoids and the like. Once the panels 34 are detached from the capsule 12, the floatation device 36 inflates to preferably form a generally circumferential collar about the capsule. However, it is to be understood that the floatation device 36 need not be fully circumferential. In some embodiments, the force against the panels 34 as the floatation device 36 expands is sufficient to fully or partially detach the panels 34 from the capsule 12 without the need to use explosive bolts or the like, in the manner that an airbag is deployed from within a hidden compartment in an automobile. The placement of the floatation device 36 about the capsule 12 and the total floatation capacity of the floatation device are such as to bring the capsule 12 to the surface in a generally vertical orientation. The floatation device 36 may include more than one compartment and/or may include a number of separate devices for protection against loss of floatation if one compartment or device fails to inflate or is damaged.

Figure 3:
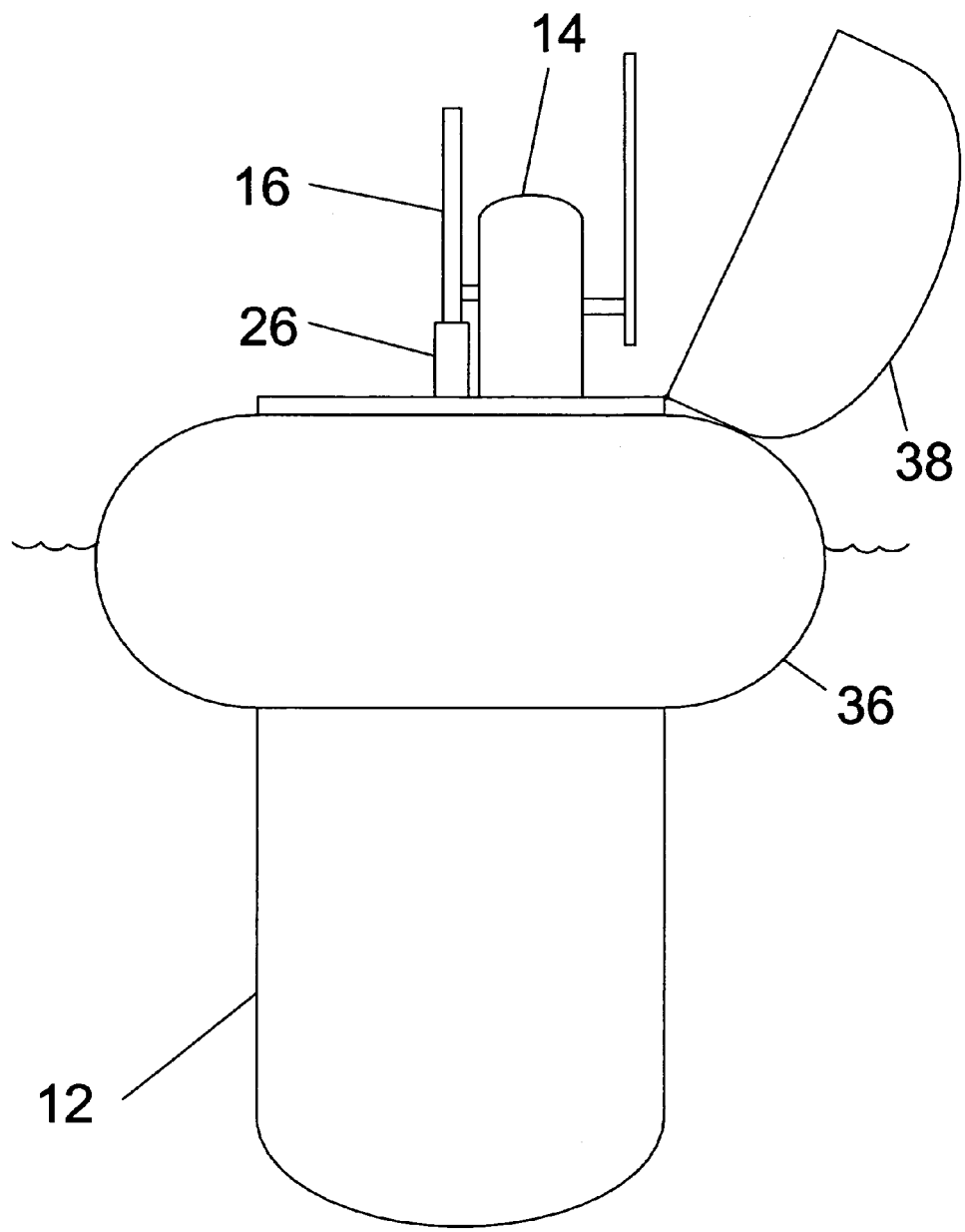
FIG. 3 illustrates the UAV deployment system upon reaching the surface and beginning to deploy the UAV.

FIG. 3 illustrates the capsule 12 being held afloat at a surface by means of the floatation device 36 as deployment of the UAV 14 has begun. Preferably, but not necessarily, the sensors 30 (shown in FIG. 1) may determine when the capsule 12 has breached the surface and if conditions exterior to the capsule are satisfactory for deployment. For example, weather gauges, accelerometers, tiltmeters and/or other sensors 30 can gauge the surrounding sea state. To initiate deployment, a hatch or cap 38 is fully or partially detached from the capsule 12, as shown in FIG. 3. Detachment may be by means similar to one of those described for detachment of the panels 34 (shown in FIG. 2), or the deployment of the UAV 14 may cause the cap 38 to detach. The lifting or moving means, such as the drum 18 and cable 22 shown and described with relation to FIG. 1, but not shown in FIG. 3 for clarity, is operated to cause the cradle 16 with attached the UAV 14 to rise within the capsule 12 and to partially extend above the capsule.

Figure 4:
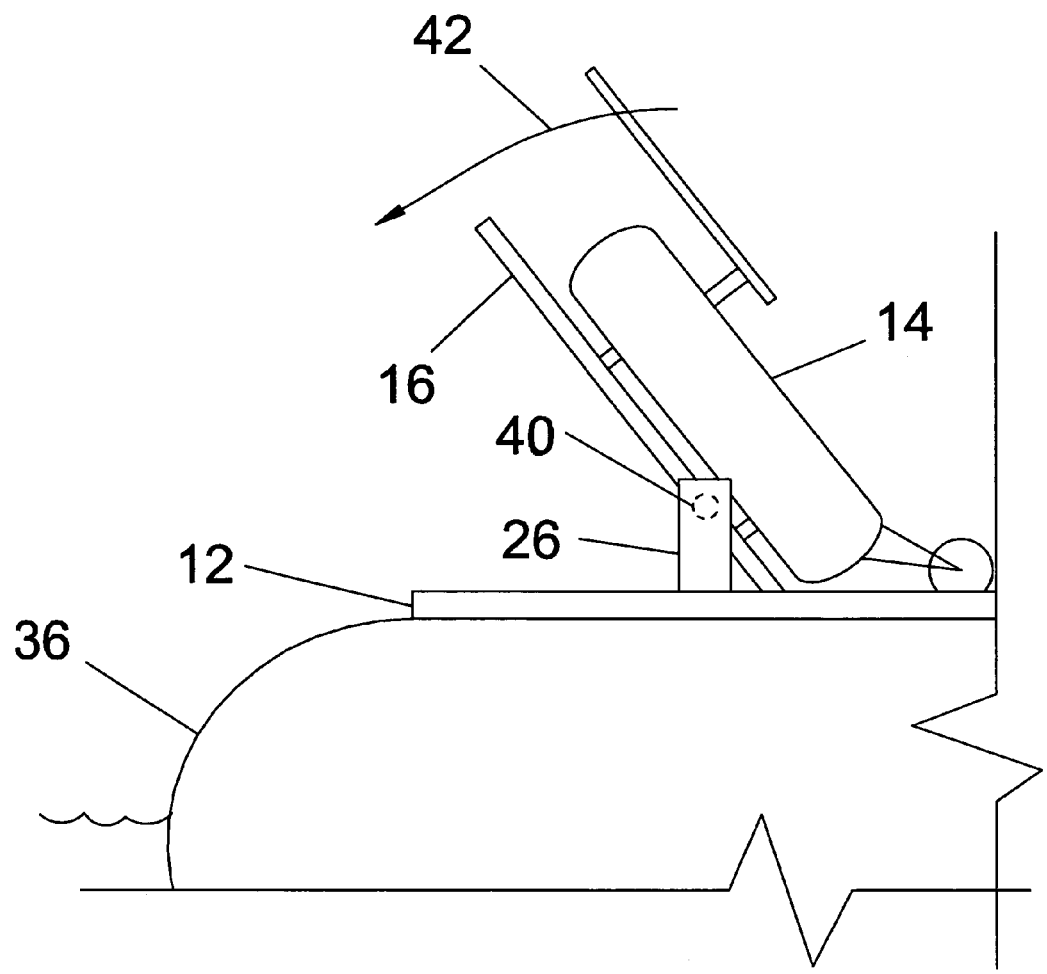
FIG. 4 illustrates the UAV secured to a launch platform and pivoting to a launch position.

FIG. 4 illustrates a partial view of the capsule 12 being held afloat at a surface of a medium by means of the floatation device 36. In the exemplary illustration of FIG. 4, lifting means 18 (not shown in FIG. 4 for clarity) has an extended cradle 16 and the UAV 14 vertically such that guide means 26 (illustrated in FIG. 4 as tabs 26a) are at least partially disengaged. The cradle 16 may pivot about attachment point 40, as indicated by arrows 42. The lifting means 18 may include limit switches or the like that can stop operation of the lifting device when the cradle 16 reaches its vertical limit. In some embodiments, the weight and position of the center of gravity of the UAV 14 on the cradle 16 in relation to the attachment point 40 can allow the cradle 16 and the UAV to pivot without further mechanical input once the guide means 26 are disengaged. In other embodiments, the guide means 26, the lifting means 18, and/or other source may provide a force against the cradle 16 to the pivot cradle 16 about the attachment point 40.

Figure 5:
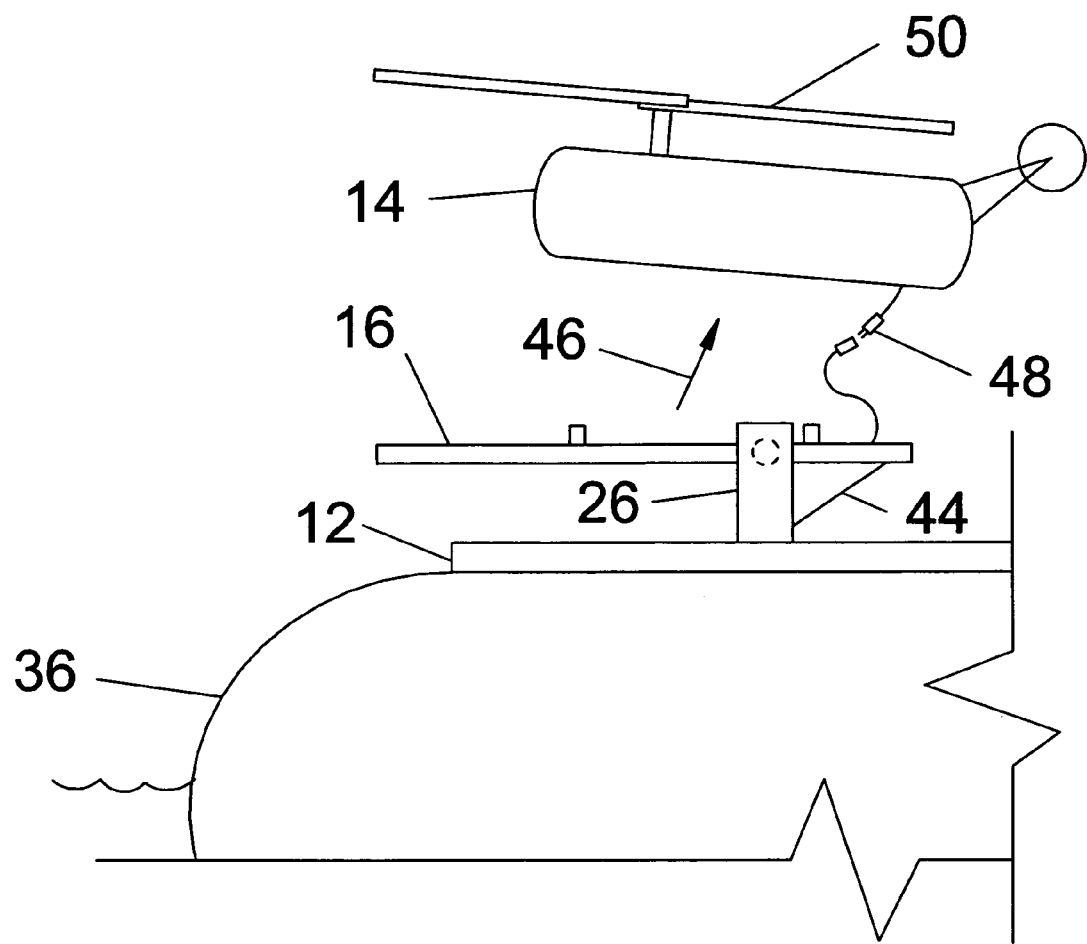
FIG. 5 illustrates the UAV being launched from the launch platform.

In some embodiments, a stop means 44 may prevent the cradle 16 from over rotation. For illustrative purposes, the stop means 44 is shown in FIG. 5 as a tether between the guide means 26 and the cradle 16, although other attachments may be contemplated. For example, the attachment of the cable 22 to the cradle 16 may serve as the stop means 44. Other stop means 44 may be used, including without limitation, a rotary damper at the attachment point 40, hydraulic cylinders, tabs within the capsule 12 that engage the cradle 16 as it pivots, and/or combinations of these and other stop means as are known in the art. The action of the stop means 44 can provide a dampening effect, including without limitation, dampening such as provided by hydraulic cylinders, rotary or other dampers, elastomeric material, springs and the like, to reduce impact forces as the cradle pivots. In addition or alternately, the combination of the position of the center of gravity, the stop means 44 and/or its dampening effect may generally maintain the cradle 16 and the UAV 14 in proper orientation for launch as wave action causes the capsule 12 to tilt. Furthermore, the floatation device 36 may be sized to better stabilize the capsule 12 in varying sea states.

FIG. 5 illustrates a partial view of the capsule 12 in which the UAV 14 is launched from a launch platform or the cradle 16, as indicated by direction arrow 46. Once the UAV 14 attains a launch position, as described with relation to FIG. 4 and shown in FIG. 5, the UAV 14 can be activated, detached from the cradle 16 and deployed, as illustrated in FIG. 5. Attachment and detachment of the UAV 14 to the cradle 16 may be by means similar to one of those described for detachment of the panels 34, including without limitation, explosive bolts, spring loaded latches, magnetic catches, solenoids and the like. The power and/or control connections from electronic controls 28, sensors 30 and/or power source 32 to the UAV 14 may include a break-away or other type of releasable connector 48 that detaches from the UAV 14 at launch, as is known in the art.

Figure 6:
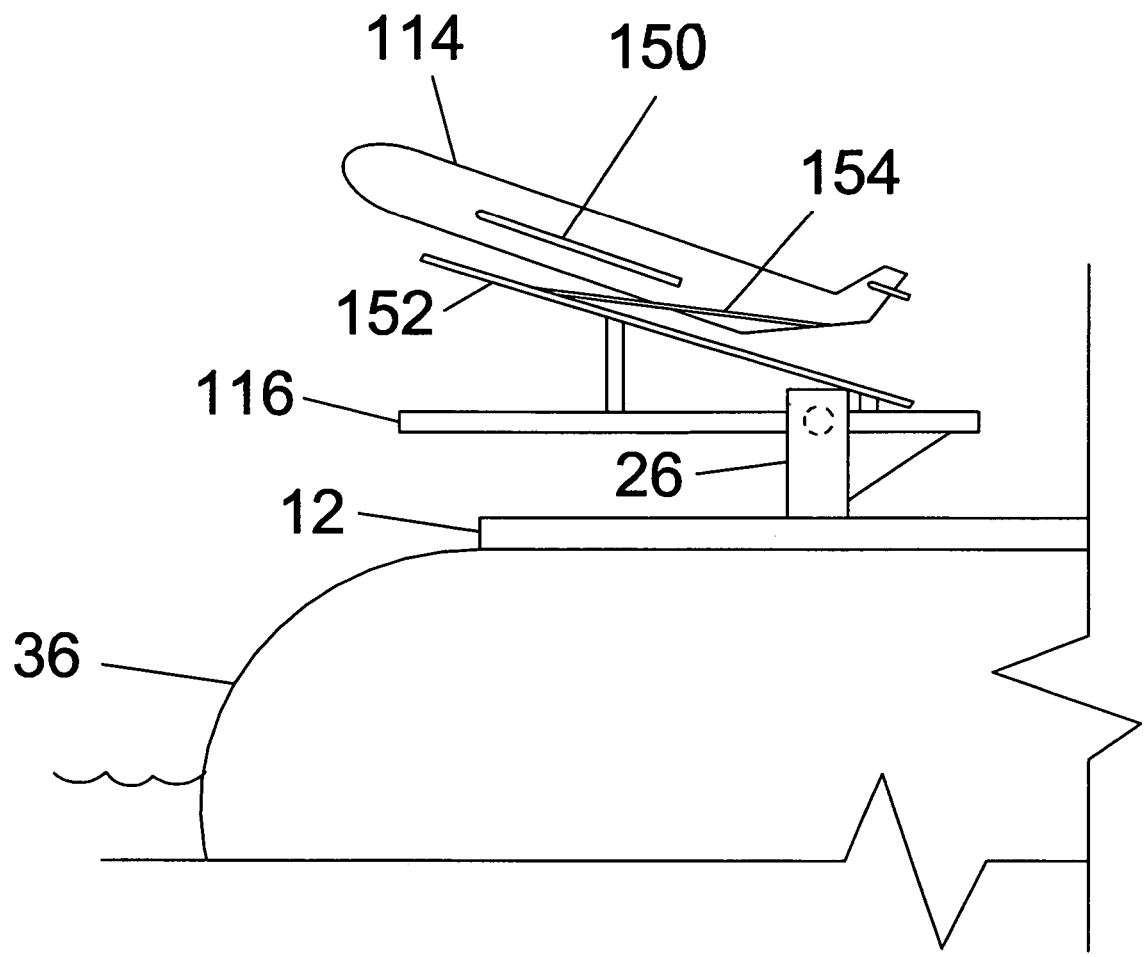
FIG. 6 illustrates a fixed-wing UAV being launched from the launch platform.

For the embodiment illustrated in FIG. 5, the UAV 14 is a vertical take off and landing (VTOL) UAV, such as a small helicopter sized to fit within the capsule 12. In other embodiments, such as illustrated in FIG. 6, a fixed-wing (FW) UAV 114 may be launched. For accommodation within the capsule 12, lifting surfaces or blades 50 of the VTOL UAV 14 or wings 150 of the FW UAV 114 may be stored in a folded position prior to flight. For the FW UAV 114 of FIG. 6, cradle 116 may include a ramp structure 152 that maintains an inclined orientation such that the FW UAV 114 may be launched at an angle suitable for the FW UAV 114 to attain flight. A launching mechanism 154 may be provided to assist FW UAV 114 in attaining flight, such as a stored energy device including without limitation spring-loaded devices, stretched elastomeric bands, pressurized pistons, and/or other known stored energy devices or combinations thereof. While launching mechanism 154 may also or alternately include such devices as rocket boosters and the like, such devices may provide unwanted heat traces. However, the choice of such devices may depend on the mission being accomplished. As an example, a search and rescue mission may not be impacted by having such a heat trace.

While preferred embodiments of the deployment systems and methods for subsurface launched UAVs have been described in detail above, various modifications and variations of the invention are possible in light of the above teaching, a number of which have been described herein. It is therefore understood that within the scope of the appended claims the invention may be practiced otherwise and above described.

What is claimed is:

1. A system for deploying an Unmanned Aerial Vehicle (UAV) from a platform submerged in a medium, the system comprising:

a capsule enclosing the UAV in a watertight manner when submerged;

a floatation device attached to said capsule, said floatation device providing buoyancy to said capsule to bring said capsule to a surface of the medium after launch of said capsule from the submerged platform;

a hatch forming an opening in said capsule to allow the UAV to exit said capsule, said hatch opening after said capsule reaches the surface of the medium;

a lifting means within said capsule for moving the UAV from within said capsule, through said hatch and to a position exterior to said capsule; and a cradle for releasably supporting the UAV, said cradle and the UAV rotating between an interior orientation and a launch orientation when the UAV reaches the position exterior to said capsule.

2. The system of claim 1 further comprising a guide means to maintain said interior orientation of the cradle and UAV during movement of the UAV within said capsule by said lifting means.

3. The system of claim 2 wherein said guide means comprises:

at least one rail fixed within said capsule; and at least one extension of said cradle slidably mating with said guide rail.

4. The system of claim 3 wherein said guide means comprises bearings to facilitate sliding movement between said at least one extension and said at least one rail.

5. The system of claim 4 wherein said bearings comprise linear bearings.

6. The system of claim 1 wherein said floatation device forms a collar at least partially surrounding said capsule when said floatation device is inflated, said collar being offset from a center of gravity of the capsule to maintain a longitudinal axis of said capsule in a substantially vertical position when said capsule reaches the surface.

7. The system of claim 6 wherein said floatation device comprises a plurality of chambers.

8. The system of claim 6 further comprising removable panels covering said floatation device, said panels conforming to a shape of said capsule.

9. The system of claim 1 wherein said lifting means comprises:

a motorized winch; and a cable attached at one end to said winch and at a distal end to said cradle, wherein said cable is wound on the winch to move said cradle and the UAV within said capsule.

10. The system of claim 1 wherein said lifting means is selected from a group of lifting means including a winch and cable system, a hydraulic piston, rack and pinion gearing, a screw drive and a chain drive.

11. The system of claim 1 further comprising:

a power source within said capsule for providing power for operation of said system;

controls for controlling operation of said system; and sensors for obtaining measurements of ambient conditions at least one of which is within of exterior to the capsule.

12. The system of claim 11 wherein said sensors measure a depth of the medium for determining when said floatation device is activated.

13. The system of claim 11 wherein said sensors measure sea state conditions exterior to said capsule when said capsule reaches the surface for determining when said hatch is to be opened.

14. The system of claim 1 wherein said system comprises:

a ramp structure on the cradle for releasably attaching a fixed-wing UAV such that a launch orientation of the fixed-wing UAV slopes upward away from the surface; and a launching mechanism for assisting the fixed-wing UAV in moving up said ramp structure during launch.

15. The system of claim 1 wherein lifting surfaces of the fixed-wing UAV are stored in a folded position within the capsule.

16. A system for deploying an Unmanned Aerial Vehicle (UAV) from a submerged platform, the system comprising:

a watertight elongated cylindrical capsule enclosing the UAV;

a floatation device providing buoyancy to said capsule to bring said capsule to a surface after launch of said capsule from the submerged platform, the floatation device maintaining a longitudinal axis of said capsule to be substantially vertical;

a lifting means within said capsule for moving the UAV vertically within said capsule;

a removable cap forming an opening in said capsule, said lifting means moving the UAV through opening; and a cradle for releasably supporting the UAV, said cradle and UAV rotating between a vertical interior orientation and a substantially horizontal launch orientation upon the UAV passing through the opening.

17. The system of claim 16 further comprising:

at least one guide rail fixed within said capsule;

at least one extension of the cradle slidably mating with said guide rail; and bearings to facilitate sliding movement between said at least one extension and said at least one rail.

18. The system of claim 17 wherein the lifting means comprises:

a motorized winch; and a cable attached at one end to said winch and at a distal end to said cradle, wherein said cable is wound on the winch to move the cradle and the UAV within said capsule.

* * * * *